March 30, 1971  J. H. GERMER  3,573,166
HYDRAULIC CONTROL ROD DRIVE SYSTEM
Filed July 24, 1968
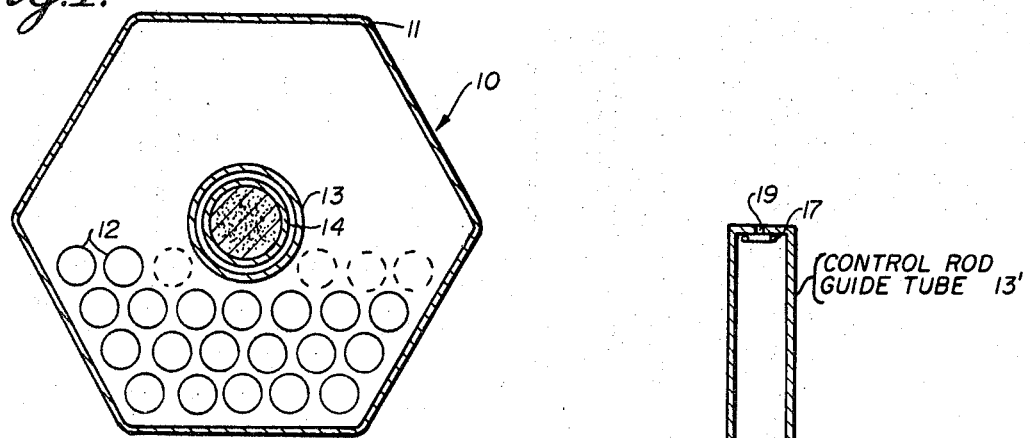
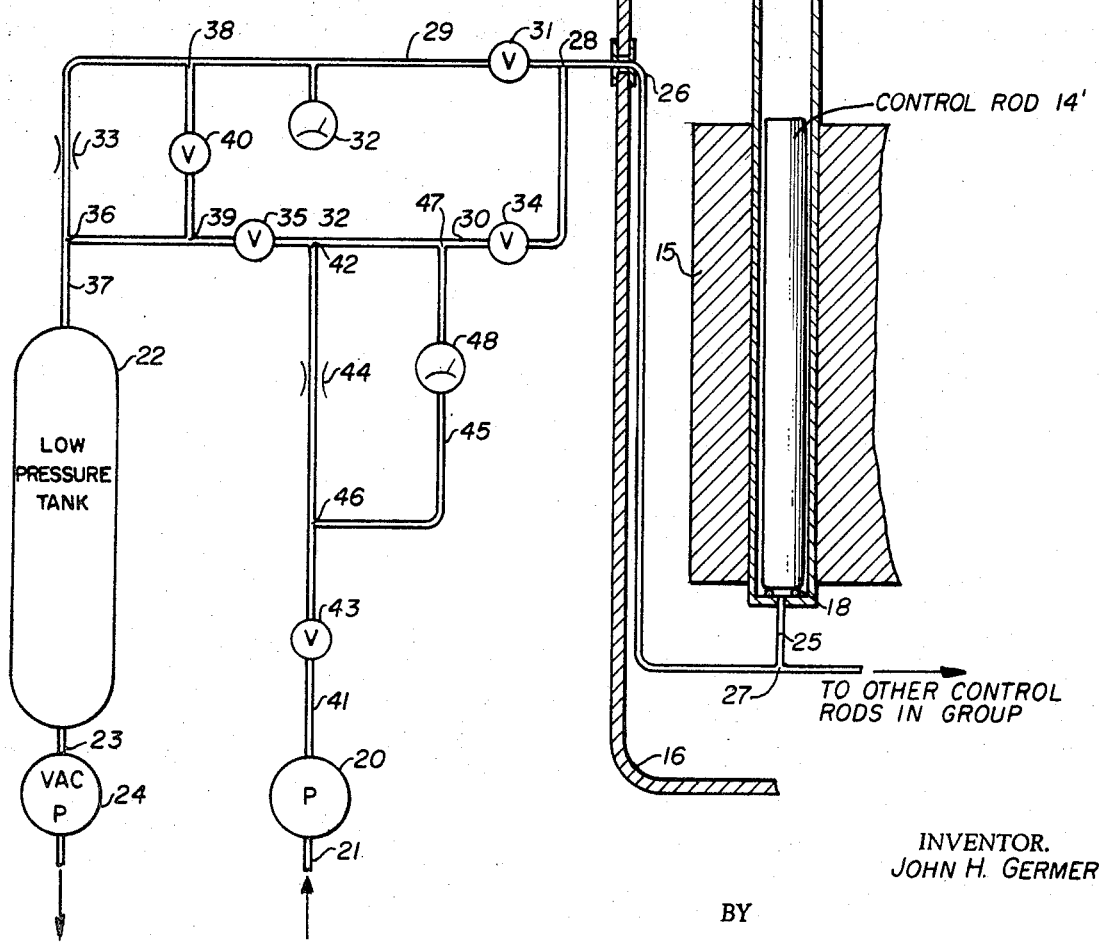
INVENTOR.
JOHN H. GERMER
BY
*Roland A. Anderson*
ATTORNEY

United States Patent Office 3,573,166
Patented Mar. 30, 1971

3,573,166
HYDRAULIC CONTROL ROD DRIVE SYSTEM
John H. Germer, San Jose, Calif., assignor to the United States of America as represented by the United States Atomic Energy Commission
Filed July 24, 1968, Ser. No. 747,161
Int. Cl. G21c 1/16
U.S. Cl. 176—36                                7 Claims

ABSTRACT OF THE DISCLOSURE

A system for controlling a nuclear reactor utilizing pressurized coolant for raising control rods out of the reactor core. The system positions individual control rods or groups thereof in either an all-in or an all-out position, and incorporates means for assuring fail-safe operation and for position indication of the rods. The simplicity of the system makes it feasible to provide a sufficient number of weak control rods to permit all-in or all-out operation without excessive increments of reactivity. The individual control rods in large thermal reactors, for example may be operated in groups widely dispersed throughout the core, sufficiently spaced that the rods have little or no interaction; while a fast reactor is much more closely-coupled. While this system is particularly applicable to sodium-cooled fast reactors, it can be adapted to other types of reactors.

BACKGROUND OF THE INVENTION

The invention described herein was made in the course of, or under, Subcontract W–31–109–38–1997 under AEC Contract No. W–31–109–Eng–38 with the United States Atomic Energy Commission.

This invention relates to nuclear reactors, particularly to sodium-cooled fast reactors, and more particularly to a system for actuating control rods by hydraulic force.

While various systems are presently known for actuating control rods for controlling the reactivity of the reactor core, these prior systems are complicated and thus expensive. The present invention has overcome at least a portion of the prior problems by providing a simple and effective control rod drive system for nuclear reactors.

SUMMARY OF THE INVENTION

While the present invention is particularly applicable to sodium-cooled fast reactors, it may be readily modified, for example, for use in boiling water reactors. Utilization of the inventive hydraulically actuated system in fast reactors is particularly attractive since a fast reactor is not very sensitive to local and overall power shaping by control rods. This permits satisfactory operation with some control rods completely in the reactor core and some completely out. In addition, the invention includes a reliable arrangement for preventing the possibility of moving several control rods at one time, while also including means for indicating the position of the various control rods.

Therefore, it is an object of this invention to provide a hydraulically actuated control rod drive system for nuclear reactors.

A further object of the invention is to provide a control rod drive system particularly adapted for use in sodium-cooled fast reactors.

Another object of the invention is to provide a hydraulically actuated control rod drive system which permits all-in or all-out operation of the control rods without excessive increments of reactivity.

Another object of the invention is to provide a control rod drive system wherein the individual control rods in certain types of reactors can be operated in groups widely dispersed throughout the core, the rods being sufficiently spaced such that the rods have little or no interaction.

Another object of the invention is to provide a hydraulically actuated control rod drive system whereupon failure of the actuating system causes all control rods to be lowered into the reactor core.

Other objects of the invention will become readily apparent from the following description and accompanying drawings, wherein:

BRIEF DESCRIPTION OF THE DRAWINGS

FIG. 1 is a plan view of a fuel bundle incorporating the inventive control rod arrangement; and
FIG. 2 is a schematic view of an embodiment of the invention particularly adapted for a sodium-cooled reactor.

DESCRIPTION OF THE EMBODIMENTS

As commonly known in the reactor art, the reactor core is provided with a plurality of fuel bundles such as the hexagonal embodiment indicated generally at 10 in FIG. 1 and defined by a channel wall 11, bundle 10 being provided with a number of fuel rods 12 within channel wall 11 and which surround a central control rod guide tube 13 containing a movable control rod 14 of neutron-absorbing material. As known, the control rod 14 is moved with respect to the fuel rods 12 to control the reactivity of the reactor, the control of rod 14 being described in detail hereinafter with respect to FIG. 2.

For purposes of clarity in FIG. 2, the fuel bundle 10 of FIG. 1 has been omitted with only a control rod guide tube 13' shown extending through a reactor core 15 mounted in reactor vessel 16 as known in the art, a control rod 14' being positioned in the core 15 in the all-in or reactor shut-down location. While not shown, core 15 is surrounded by liquid sodium coolant as common in the art. Since the invention is directed to the control rod drive system, further details of the remainder of the reactor is deemed unnecessary and are thus not illustrated or described.

Control rod guide tube 13' extends about one core height above the top of core 15, and is provided at each end thereof with face seals 17 and 18, the upper end of guide tube 13' being additionally provided with an aperture 19 through which fluid is discharged into vessel 16, as described hereinafter. Control rod 14' is of a cross-section smaller than the internal cross-section of guide tube 13', thereby allowing a loose fit therebetween and a small amount of fluid leakage thereby, except when rod 14' is positioned against either of face seals 17 or 18 which substantially prevents fluid leakage past the rod 14'. While not shown, and if desired, a dashpot arrangement can be incorporated at the ends of the guide tube 13' to prevent impacting of the control rod 14' against the ends of the guide tube.

FIG. 2 shows a schematic of the operating circuit for the inventive control rod drive system, only one control rod 14' being illustrated. However, it is understood, and pointed out above, that individual control rods such as 14' can be operated in groups widely dispersed throughout the core 15 by the hereinafter described system as indicated by the arrow and legend below core 15. Hydraulic pressure for operating the present system is supplied by a sodium pump 20 or other suitable source, an intake 21 thereof being connected to the reactor cooling system or to another supply of liquid sodium. A low pressure tank 22 is maintained at a pressure considerably below the pressure within reactor vessel 16 by a connection 23 to a vacuum pump 24 or the like.

The hydraulic lines or conduits, valves and other components interconnecting control rod guide tube 13' with sodium pump 20 and low pressure tank 22 are as follows: A tap line 25 connects the interior of the lower end of guide tube 13' with a main line 26 at connection 27. Line 26, as pointed out above and as indicated by the arrow and legend at the end thereof, may be similarly connected to other control rod guide tubes in a desired group. Line 26 extends through the wall of reactor vessel 16 and is coupled at connection 28 with a pair of lines 29 and 30. A valve 31, referred to hereinafter as the "down" valve, a pressure gauge 32, and restrictive type orifice 33 are operatively mounted in line 29; while valves 34 and 35 referred to hereinafter respectively as the "up" valve and "scram" valve are operatively mounted in line 30, lines 29 and 30 being coupled at connection 36 to a line 37 connected to low pressure tank 22. Connected between lines 29 and 30 via connectors 38 and 39 is an orifice bypass valve 40. A pressure supply or feed line 41 connects sodium pump 20 with line 30 at connector 42. A feed valve 43 and a restrictive type orifice 44 are operatively mounted in supply line 41. A line 45 is coupled at connection 46 to line 41 and at connection 47 to line 30, line 45 being provided with a differential pressure gauge 48 which, due to the line connections, is in parallel with orifice 44.

All of the system components in FIG. 2 which are shown to the left of the "up" and "down" valves 34 and 31, respectively, are common to either the entire control rod drive system of the reactor or to a large portion thereof. Valves 31 and 34 and main line 26 are the connector components between the common system and the individual control rod 14' or group of such control rods, and would be duplicated to provide such connector components for each group of rods utilized in the reactor core 15, whereby each rod or group of rods can be individually controlled as described hereinafter. During normal operation, valves 31, 35 and 40 remain closed and valves 34 and 43 remain open. The valves 31, 34, 35, 40 and 43, for example, may be of the solenoid actuated type.

To start raising control rod 14' from its all-in position, as shown in FIG. 2, to its all-out position (raised to the upper end of guide tube 13' and in abutment with face seal 17), an "up" valve 34 is opened allowing fluid flow under pressure from sodium pump 20 via lines 41, 30, 26 and 25 to the lower end of guide tube 13' wherein the pressurized fluid forces the control rod 14' upward in guide tube 13'. The restrictive orifice 44 in line 41 is sized to provide only sufficient flow to raise that group of control rods 14' and provide for the leakage that would occur between rods 14' and guide tubes 13' due to the loose fit of the control rods, this leakage being discharged from guide tubes 13' via the apertures 19 in the upper end of the guide tubes.

During transit of control rod 14' from the bottom to the top of guide tube 13', differential pressure gauge 48 will show a pressure drop. When all of the control rods 14' in the group are firmly seated on the associated face seal 17 at the top of each guide tube 13', the all-out position, the fluid flow through line 26 will drop to a very low value to account for very small inadvertent leakage past the face seal 17. The all-out position of the control rod 14' is indicated by a return of pressure gauge 48 to a near-zero reading. At this time a second group of control rods can be raised in a like manner. The pressure drop between valve 34 and the control rod 14' should be such that sufficient pressure is maintained on the bottom of the control rods that are in the up or all-out position to prevent their dropping into the reactor core or all-in position.

If an attempt is made to raise more than one group of control rods 14' at a time, the flow limitation of orifice 44 prevents sufficient fluid flow from pump 20 to raise the rods due to the very loose or leaky fit between the control rod 14' and the guide tube 13'. If the fluid supply, liquid-sodium coolant in this case, fails, the rods 14' will all fall into the core 15, and a subsequent restarting of the fluid supply pump 20 cannot lift any of the control rods unless only a single "up" valve 34 is open.

Normal lowering of the control rods 14' into the core 15 is accomplished by closing the "up" valve 34 and allowing the control rods to descend by gravity due to the leakage of fluid around rod 14. A fast "scram" (reactor shutdown) is accomplished by opening scram valve 35, valve 34 being open, which suddenly lowers the pressure below all of the control rods which are in the up position by connecting line 26 via lines 30 and 37 with low pressure tank 22. During such a "scram" operation, sodium feed valve 43 would be closed at the opening of scram valve 35 to prevent an excessive amount of flow from the pump 20 to the low pressure tank 22. Also, it should be noted that during normal shutdown, as well as a "scram" situation, the coolant pressure within reactor vessel 16 will be applied to the top of control rod 14' via the aperture 19 in the top of guide tube 13' and assists the force of gravity on control rod 14' in overcoming the fluid pressure remaining beneath the control rod and thus increasing its downward movement into core 15.

In order to indicate a down position of a group of control rods 14', a sampling method is used. Opening "down" valve 31, with "up" valve 34 closed, exposes the lower end of the control rods 14' through lines 25, 26, 29 and 37 and orifice 33 to the low pressure tank 22. If all of the control rods in that group are seated in the down position (on face seals 18), pressure gauge 32 in line 29 will show a low pressure reading. However, if one or more of the rods 14' are not seated on face seal 18, the gauge 32 will show a relatively higher pressure reading. In the event that the pressure gauge 32 indicates that one or more control rods 14' are not seated on face seals 18, orifice bypass valve 40 is opened, greatly reducing the pressure below the control rod and forcing it down by reactor coolant pressure via aperture 19 in guide tube 13'.

If a control rod 14' is stuck, and cannot be freed by the above described method, both valves 31 and 34 should be left closed, and an uncertainty be applied to the control rod program. At any time that such a control rod frees itself, it can only fall into the reactor core and decrease reactivity thereof.

The entire control rod guide tube 13 and control rod 14 (see FIG. 1) are removed from the reactor core as an integral part of the fuel bundle 10. Connection to the control actuating system (line 25 of FIG. 2) is made when the fuel bundle is lowered onto its bottom seat, not shown, in core 15, for example. This connection can be made by utilizing the weight of the fuel bundle against a face seal in the bottom seat therefor, or it can be made by the lower end of guide tube 13 or 13' being inserted into a sealed socket or face seal similar to the manner in which control rod 14' abuts face seal 18 in FIG. 2. The entire fuel bundle 10, including guide tube 13, is approximately two core heights high. In certain reactors, the coolant surrounding the fuel handling equipment is required to be greater than twice the core height, thus no extra depth of coolant is required over that for the conventional fuel bundles.

To modify the above-described hydraulic control rod drive system for utilization in a boiling water reactor, for example, the sodium pump 20 would be replaced by a feedwater pump and the low pressure tank 22 would be connected to a condenser instead of to the vacuum pump 24.

The present invention eliminates all control rod penetrations at the bottom of the reactor vessel and permits the placement of equipment, such as recirculation equipment, directly below the reactor vessel 16, thereby reducing the containment area of the reactor. In addition, when utilized in a boiling water reactor, the feedwater pump would be of the jet type, thus permitting a reactor vessel with no penetrations below the top of the reactor, which could simplify emergency cooling problems and substantially eliminate the need for a core spray.

Due to the present invention, the following variations of the overall reactor could result:

(1) It is not limited to a hexagonal fuel bundle, nor is it limited to a single control rod per bundle. It is desirable, however, if more than one control rod is included in a fuel bundle, that these control rods be actuated on separate hydraulic circuits.

(2) Since the alignment of the control rods with the fuel bundles is entirely self-contained in the assembly, it is possible to place fuel bundles in non-parallel positions. For example, a core can be made in a close-packed array at the bottom, and spread at the top to include coolant gaps between fuel bundles. In this manner one can compensate for coolant boiling voids and maintain an approximately constant moderator to fuel ratio over the entire core height.

(3) The control rod could be other than cylindrical, although the cylindrical shape is the easiest to fit and prevent sticking.

(4) The control rod can be segmented axially, but joined into a unit. This may be helpful to overcome any tendency to stick if the rod tends to bow.

It is thus seen that the present invention provides a system wherein the control rods are raised out of the reactor core by hydraulic force in such a way to prevent removal of more than one rod or group at a time. Failure of the actuating pressure causes all control rods to lower, and subsequent raising can only take place one rod or group at a time. Thus, the individual control rods can be maintained only in the all-in or all-out position with respect to the reactor core, which is particularly suitable for sodium-cooled fast reactor, for example.

Although particular embodiments of the invention have been illustrated and described, modifications and changes will become apparent to those skilled in the art, and it is intended to cover in the appended claims all such modifications and changes as come within the spirit and scope of the invention.

What I claim is:

1. In a nuclear reactor having a reactor core, a hydraulically actuated control rod drive system comprising: at least one control rod guide tube adapted to be vertically positioned in a reactor core and having a length about twice an associated reactor core height, a neutron absorbing control rod loosely positioned in said guide tube, said control rod having a length about one-half of said guide tube length, said guide tube being closed at each end and provided with a seal means at the upper and lower surface thereof, each of said seal means being constructed so as to cooperate with an adjacent end of said control rod to effect a fluid seal therebetween, said guide tube additionally being provided with an aperture in the upper end thereof, a low pressure means, first conduit means operatively connecting said low pressure means with said lower end of said guide tube for providing fluid communication therebetween, high pressure fluid supply means, second conduit means operatively connected to said first conduit means and to said high pressure fluid supply means, a first valve means positioned in said first conduit means intermediate said guide tube and said second conduit means for controlling fluid flow through said first conduit means to and from said guide tube, second valve means positioned in said first conduit means intermediate said low pressure means and second conduit means for controlling fluid flow to said low pressure means, and third valve means positioned in said second conduit means for controlling fluid flow from said high pressure fluid supply means, whereby opening of said first and third valve means and closing of said second valve means directs fluid from said high pressure fluid supply means through said second and first conduit means to the lower end of said guide tube for raising said control rod to contact said seal means at said upper end of said guide tube, and closing of said third valve means and opening of said second valve means with said first valve means being open allows a fast release of fluid from said guide tube to said low pressure means for immediate lowering of said control rod in said guide tube and to contact said seal means at said lower end of said guide tube.

2. The control rod drive system defined in claim 1, additionally including a third conduit means, said third conduit means being connected at one end thereof to said first conduit means at a point intermediate said first valve means and said control rod guide tube and at the other end thereof to said first conduit means at a point intermediate said low pressure means and said second valve means, and fourth valve means operatively positioned in said third conduit means.

3. The control rod drive system defined in claim 2, wherein said third conduit means is additionally provided with a restrictive orifice and a pressure gauge positioned intermediate said fourth valve means and said other end of said third conduit means, said pressure gauge being located between said restrictive orifice and said fourth valve means, and fifth valve means operatively interconnecting said first and third conduit means, said fifth valve means being connected to said third conduit means intermediate said restrictive orifice and said pressure gauge and connected to said first conduit means intermediate said second valve means and said point of interconnection of said other end of said third conduit means with said first conduit means.

4. A control rod drive system defined in claim 1, wherein said low pressure means comprises a low pressure tank, and a vacuum pump operatively connected to said tank.

5. The control rod drive system defined in claim 1, wherein said high pressure fluid supply means includes a pump means adapted to be connected to a fluid supply.

6. The control rod drive system defined in claim 1, additionally including a restrictive orifice mounted in said second conduit means intermediate said third valve means and said first conduit means, fourth conduit means connected at one end thereof to said second conduit means intermediate said third valve means and said restrictive orifice and at the other end thereof to said first conduit means intermediate said first and second valve means, and differential pressure gauge means positioned in said fourth conduit means.

7. The control rod drive system defined in claim 1, in combination with a nuclear fuel bundle, said fuel bundle including a plurality of fuel rods, said control rod guide tube being positioned among said fuel rods such that approximately one-half of said guide tube extends above said fuel bundle when said fuel bundle is positioned in an associated reactor core.

References Cited

UNITED STATES PATENTS

| 3,020,888 | 2/1962 | Braun | 176—36UX |
| 3,347,747 | 10/1967 | West et al. | 176—35 |
| 3,347,748 | 10/1967 | Olsson | 176—36 |
| 3,390,052 | 6/1968 | McDaniels, Jr. | 176—35 |
| 3,432,387 | 3/1969 | Jonsson | 176—36 |
| 3,486,975 | 12/1969 | Ripley | 176—36 |

FOREIGN PATENTS

| 612,009 | 1/1961 | Canada | 176—86 |

LELAND A. SEBASTIAN, Primary Examiner

H. E. BEHREND, Assistant Examiner